Patented July 17, 1923.

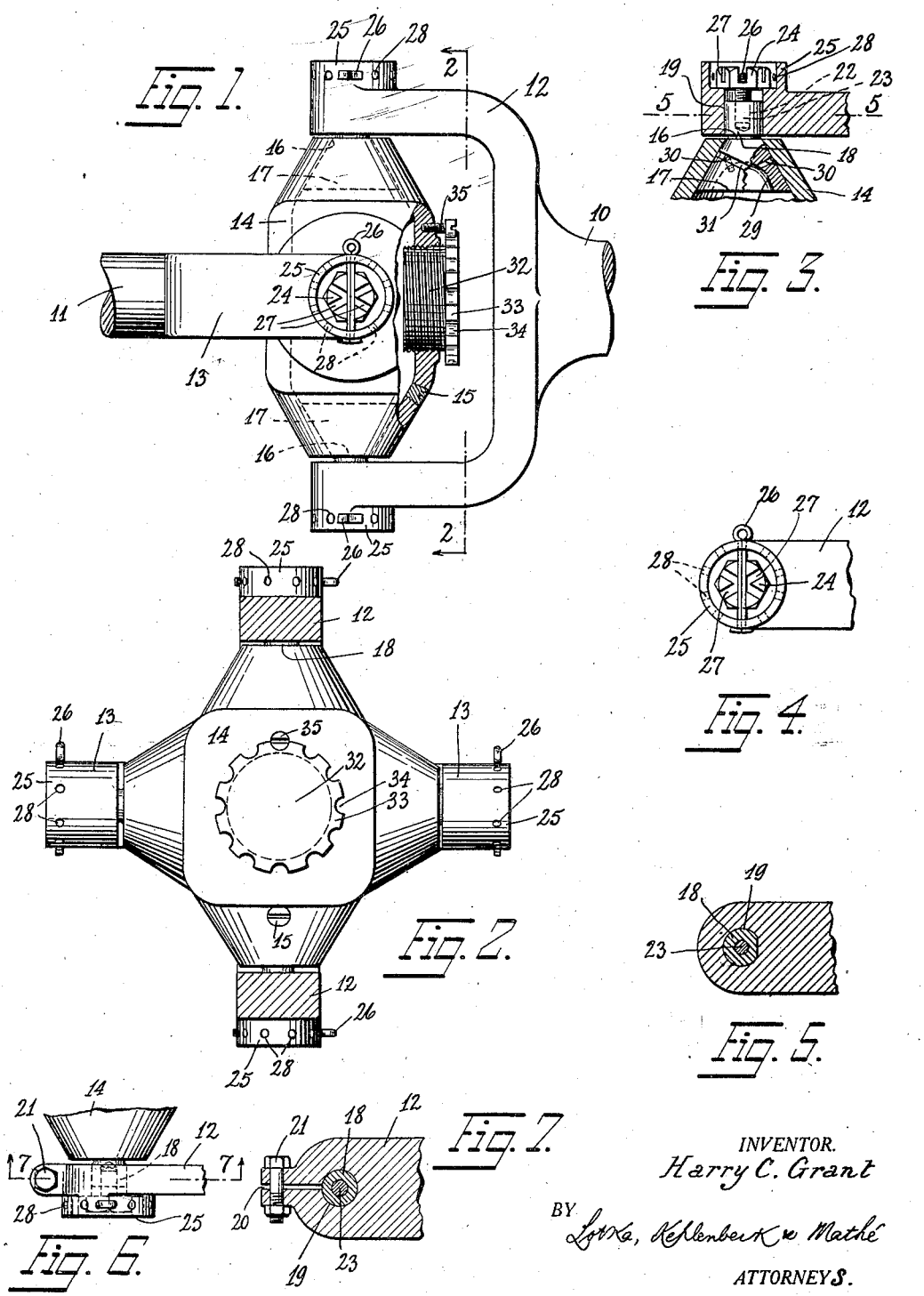

1,462,276

UNITED STATES PATENT OFFICE.

HARRY C. GRANT, OF BAYONNE, NEW JERSEY.

UNIVERSAL JOINT FOR SHAFTS.

Application filed September 9, 1921. Serial No. 499,462.

*To all whom it may concern:*

Be it known that I, HARRY C. GRANT, a citizen of the United States, and resident of Bayonne, in the county of Hudson and State of New Jersey, have invented certain new and useful Improvements in Universal Joints for Shafts, of which the following is a specification.

My invention relates to universal joints for shafts and is intended primarily for use on automobiles, in connection with the shaft which transmits power from the engine to the differential on the rear axle; but I desire it to be understood that this invention may be used in other relations. The object of the present invention is to provide a universal joint which will retain its lubricant readily, especially efficient provision being made against leaking of the lubricant. Another object of my invention is to enable adjustments to be made for taking up wear, without removing the universal joint from the car or other structure, or putting in any new parts.

Two examples of my invention are illustrated by the accompanying drawings, in which Fig. 1 is a side elevation of the improved joint, with parts in section; Fig. 2 is a section substantially on line 2—2 of Fig. 1; Fig. 3 is an enlarged detail view, with parts in section; Fig. 4 is a detail end view of one of the connecting studs or lugs and adjacent parts; Fig. 5 is a cross-section on line 5—5 of Fig. 3; Fig. 6 is a partial side view of another form of my invention; and Fig. 7 is a cross-section on line 7—7 of Fig. 6.

In Fig. 1, 10 and 11 indicate the two shafts from one of which motion is transmitted to the other; for instance, 10 may represent the driving shaft, and 11 a shaft driven therefrom by means of the improved universal joint. Each of these shafts is formed or connected with a fork 12, 13, respectively, the planes of the two forks being at right angles to each other, as is usual in joints of this character.

Between the ends of the two forks is located a box 14, adapted to be filled with grease or other suitable lubricant, for instance through a hole normally closed by a screw plug 15.

This box is provided with hollow bosses arranged in pairs at right angles to each other and having radial openings 16 corresponding to the position of the fork members 12 and 13 which straddle each pair of bosses as shown in Fig. 2. The inner surfaces of said bosses converge outwardly toward said openings 16 and constitute bearing surfaces for the plugs 17 which are tapered to fit said surfaces and comprise enlarged heads of the shanks 18 of connecting lugs or studs; the latter extend through said radial openings 16 of the bosses into corresponding openings 19 of the fork members. The lugs or studs 17, 18 are adjustable in and out, to take up wear and to give them a proper position for efficient work; but any turning of the connecting lugs relatively to the fork members is prevented in any suitable way as by a longitudinal key, or by providing a flat place on the shank 18 of the lug, and a corresponding flat place in the wall of the opening 19, as shown in Fig. 5. Another way of preventing the lugs from turning relatively to the fork members, is indicated in Figs. 6 and 7, where the fork member is split, as indicated at 20, at the socket or opening 19, and a screw bolt 21 serves to clamp the lug 17, 18 (after adjustment) with sufficient force to hold it against rotation relatively to its fork member.

To adjust the connecting lugs 17, 18, I have shown the following arrangement: The outer end of the shank 18 is made with an axial screw-threaded recess 22, into which fits the shank 23 of an adjusting screw, the head 24 of said screw bearing against the outer face of the fork member 12 or 13. Preferably the fork member is made with a wall or flange 25 surrounding the screw head 24, so that the latter is countersunk. To lock the screw after adjustment, I may employ a cotter pin or like device 26, passed through one of the transverse openings or slots 27 in the head 24, and also through an opening 28 in the fork wall 25. I prefer to provide a plurality of openings 28, in such relation to each other that a very accurate adjustment of the screw 23, 24 may be obtained; for instance, if the openings 27 are 60° apart, as shown, and if there are ten openings 28, 36° apart, it will be possible to lock the screw 23, 24 in any one of thirty different positions, 12° apart.

To insure a good distribution of the lubricant between the contacting surfaces of the box 14 and of the heads 17 of the connecting lugs, I prefer to make these heads with recesses, such as 29 open to the interior of the box and communicating, by holes 30, with grooves 31 arranged spirally or otherwise on the outer surfaces of the heads 17.

It will be understood that the screws 23, 24 are turned until the heads 17 are drawn against the inner surface of the box with proper tightness, leaving a sufficient play for the required looseness of the joint. Lubricant contained in the box 14 cannot escape therefrom, or at least only in such small amounts that replacement or refilling will be required only at long intervals. I thus avoid the danger of the joints being injured by the lugs becoming dry or insufficiently lubricated, as frequently happens with universal joints as made hitherto. In case, owing to wear of the seated surfaces of the heads 17, the box 14 should become too loose relatively to the fork members 12, 13, the proper readjustment of the connecting lugs 17, 18 can be effected readily by turning the screws 23, 24 (after removing the respective cotter pins 26), the screws being locked again after such re-adjustment. It will be noted that this re-adjustment does not require the universal joint to be removed from the car, machine, or other structure in which it is employed; nor is it necessary to substitute new connecting lugs when taking up wear, but the same lugs can be re-adjusted repeatedly, without disturbing or dismembering the universal joint.

The connecting lugs 17, 18 may be introduced into the box 14 through a suitable opening, normally closed by a plug 32, and of a diameter somewhat greater than the wide end of the head 17. This plug may also serve to compress the lubricant in the box 14, in which case it is made as a screw plug, see Fig. 1, and adjustment may be effected by turning the plug flange 33, which has notches 34 in its periphery adapted to receive a locking screw 35 fitted removably to the box 14. The main purpose of the screw 35 is to hold the plug 32 against being jarred loose and coming off, or at least becoming so loose as to cause the lubricant to leak out. It is not essential that the plug 32 should at the same time act as an adjustable plunger to compress the lubricant.

While the shaft 11 has been referred to as the driven shaft, it will be understood that it need not be the final driven shaft, but it may be an intermediate driven shaft, the opposite ends of which are connected, by universal joints of the character set forth, with the driving shaft 10 and with the final driven shaft respectively. Inasmuch as double universal joints are not uncommon in this art, I have not deemed it necessary to illustrate this form of my invention.

I claim:—

1. A universal joint comprising a central member having a lubricant chamber, hollow bosses located upon said member in pairs at right angles to each other and communicating with the lubricant-chamber, the inner surfaces of said bosses converging outwardly, fork members straddling each pair of bosses, a driving shaft connected with one of said fork members, a driven shaft connected with the other fork member, tapered plugs fitted within said bosses and constituting bearings for said central member, shanks projecting outwardly from said tapered plugs into said fork members and means whereby said shanks are adjustably secured in said fork members.

2. A universal joint comprising a central member having a lubricant chamber, hollow bosses located upon said member in pairs at right angles to each other and communicating with the lubricant-chamber, the inner surfaces of said bosses converging outwardly, fork members straddling each pair of bosses, a driving shaft connected with one of said fork members, a driven shaft connected with the other fork member, tapered plugs fitted within said bosses and constituting bearings for said central member, said plugs having recesses communicating with said lubricant chamber and with surface grooves connected with said recesses, shanks projecting outwardly from said tapered plugs into said fork members and having screwthreaded apertures and adjusting screws threaded into said shanks and bearing against said fork members, whereby said plugs are adjusted relatively to said bosses.

In testimony whereof I have signed this specification.

HARRY C. GRANT